Sept. 20, 1971 P. B. MILLS ET AL 3,606,094
MIXING AND DISPENSING SYRINGE

Filed June 5, 1969 2 Sheets-Sheet 1

INVENTORS
PETER B. MILLS
ARTHUR B. SILVER

BY Newton, Hopkins, & Ormsby

ATTORNEYS

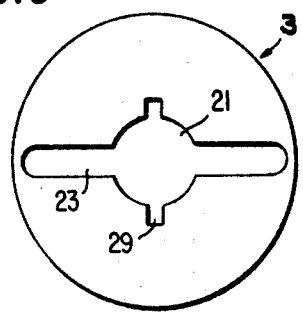
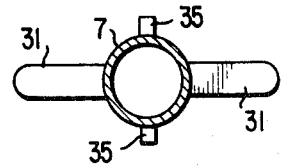
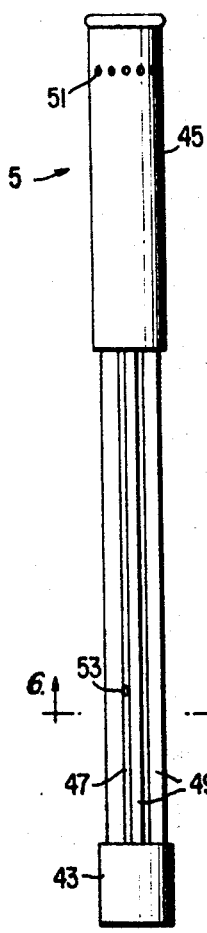
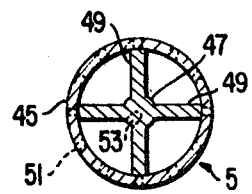
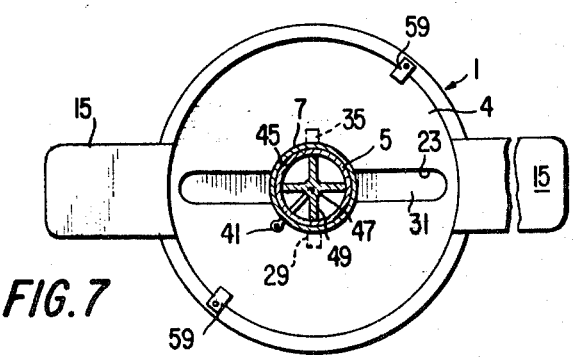
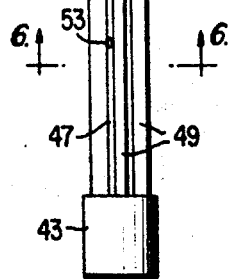
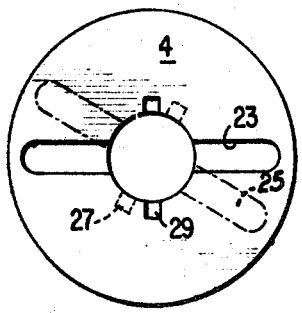
INVENTORS
PETER B. MILLS
ARTHUR B. SILVER
BY *Newton, Hopkins, & Ormsby*
ATTORNEYS 3,606,094
MIXING AND DISPENSING SYRINGE
Peter B. Mills, 3502 Spring Circle, Decatur, Ga. 30032, and Arthur B. Silver, 3510 Rosewell Road NE., Apt. M-3, Atlanta, Ga. 30305
Filed June 5, 1969, Ser. No. 830,672
Int. Cl. B67d 5/60
U.S. Cl. 222—145  7 Claims

ABSTRACT OF THE DISCLOSURE

A mixing and dispensing device having a housing suitable for containing a fluid, a fluid outlet and containing a mixing device movable between first, second and third positions, such that when the mixing device is in its first position, the device is contained within the housing so as to be capable of subjecting a fluid contained within the housing to a mixing action, when the mixing device is in its second position, the device is partially removed from the housing and engagedly attached to a stopper, and when the mixing device is in its third position, the mixing device is again contained within the housing in engaging relationship with the stopper so as to form a piston which is used to urge a fluid contained within the housing through a fluid outlet.

BACKGROUND OF THE INVENTION

Field of invention

Figure 1:
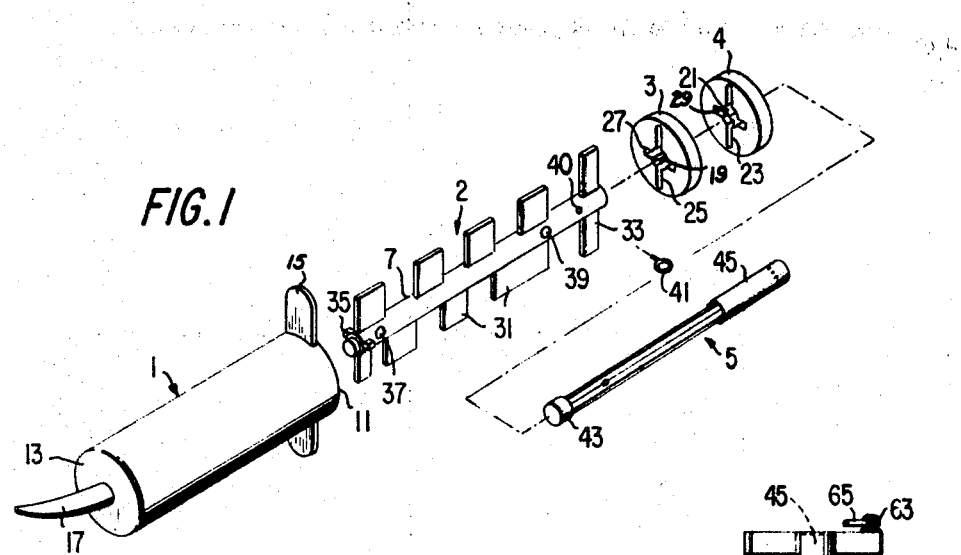

This invention relates generally to apparatus for agitating and dispensing and more particularly to syringe type apparatus suitable for mixing and dispensing dental rubber base materials.

Description of prior art

Rubber base impression materials, known also as elastomers or synthetic rubber compositions, are widely used by the dental profession because of their ability to form extremely accurate dental impressions. Typically, this type of rubber base impression material is supplied in a two component system comprising a base and a crosslinking agent or "accelerator." While a large variety of base and accelerator materials are known, one common type of system is the polysulfide base or polyfunctional mercaptan, representable by the

wherein each R may be a $C_2H_4$—O—$CH_2$—O—$C_2H_2$ group, with a $SnO_2$ and sulphur accelerator. In another common type of system, the silicone rubber of polydimethylsiloxane system representable by the formula:

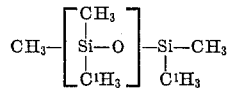

is used with an organo-metallic compound accelerator, such as tin octoate or tin caprylate or an alkyl silicate, such as ethyl or butyl silicate.

The viscosity of the base materials varies from light, i.e., slightly more viscose than ordinary toothpaste, to heavy, i.e., about as viscose as heavy molasses. In the present invention, the device, which is hereinafter described operates best with the intermediate base material, but will also function satisfactorily with either a light or a heavy base.

In order to make a dental impression, the base and accelerator are mixed outside the mouth and applied to the tooth region within the mouth in its uncured state. The system is is then permitted to cure so that an impression of the desired area is obtained after which the rubber material is removed from the mouth for further dental processing. Several problems have been encountered by the dental profession in using this type of system. For instance, unless the base and accelerator are thoroughly and homogeneously admixed prior to use, curing or hardening will occur in a non-homogeneous manner often resulting in an unsatisfactory impression. While increasing the mixing time would be desirable to protect against such defects, since curing begins to occur as soon as the base and accelerator are placed into contact, mixing must be accomplished as rapidly as possible before the materials become permanently set. Moreover, since the materials of the system are undesirably affected by moisture and impurities, it has been necessary to mix the ingredients as rapidly as possible so as to minimize the extent of their exposure with the atmosphere.

It would be desirable, therefore, to provide a device wherein the base and accelerator materials are prevented from contact with the atmosphere. It would further be desirable to provide a device wherein mixing and dispensing of the base and accelerator can be accomplished without exposure to moisture and impurities. Moreover, it would be desirable to provide a device which provides base and accelerator in preproportioned form so that mixing can be effected with uniformally consistent viscosities and setting times.

SUMMARY OF THE INVENTION

Accordingly, it is an object of this invention to provide a device which facilitates mixing and dispensing of a base and accelerator for use in making dental rubber impressions.

It is another object of this invention to provide a device wherein mixing of the base and accelerator can be accomplished without exposure of the ingredients of the system to moisture and impurities carried in the atmosphere.

Another object is to provide a dental device into which a predetermined portion of accelerator and base can be loaded so that they may be readily admixed and dispensed when required.

Still another object of this invention is to provide a disposable dental device which facilitates the mixing and dispensing of a preportioned quantity of base and accelerator.

Yet another object of this invention is to provide a disposable dental syringe device which is capable of admixing a preproportioned quantity of accelerator and base so that a uniformly consistent viscosity and setting time can be produced repeatedly.

These and other objects have now been attained by providing a disposable syringe type device which can be loaded with a predetermined proportion of accelerator and base. The syringe device is capable of admixing the accelerator and base to a homogeneous consistency and is capable of conveniently extruding the well-mixed ingredients from the syringe into a selected region of the mouth. According to this invention, a syringe is provided having enclosed therein a mixing device comprising an elongated conduit having a central bore and having a series of paddle type projections emanating therefrom. The central bore of the mixing device is partially filled with an accelerator material; and the chamber, formed by the housing, the paddle projections and the elongated conduit, is partially filled with a suitable base material. The elongated conduit contains an aperture communicating between the central bore and the chamber which is covered by an easily rupturable film. When the syringe is ready for use, the rupturable film is broken with a plunger fitted within said central bore and the accelerator and base are forced into intimate contact.

The mixing device is then activated and the accelerator and base are thoroughly admixed. The mixing device with its elongated conduit and paddle projections is then partially withdrawn from the syringe housing and is engaged in locking position with a pair of stoppers. In this position, the mixing device can be used as a plunger and the stoppers can be used as a piston for ejecting the well mixed accelerator and base from the syringe through a suitably provided tapered nipple outlet.

The several features of this invention will become more readily apparent from the following description taken in conjunction with the accompanying drawings.

BRIEF DESCRIPTION OF THE INVENTION

Figure 2:
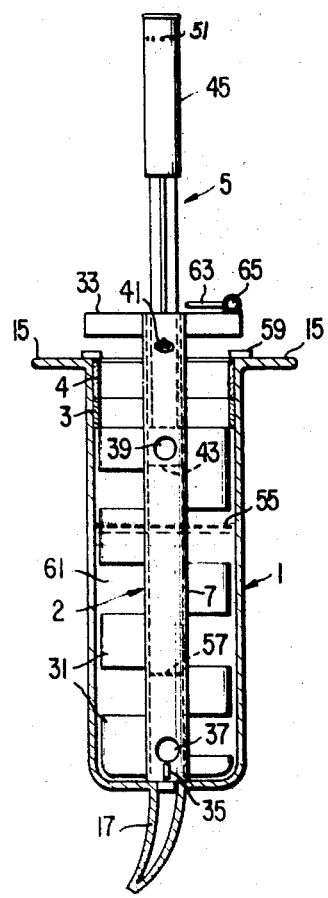
Figure 8:
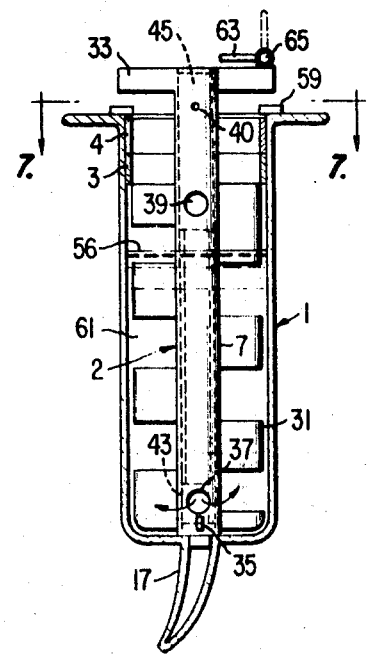
Figure 9:
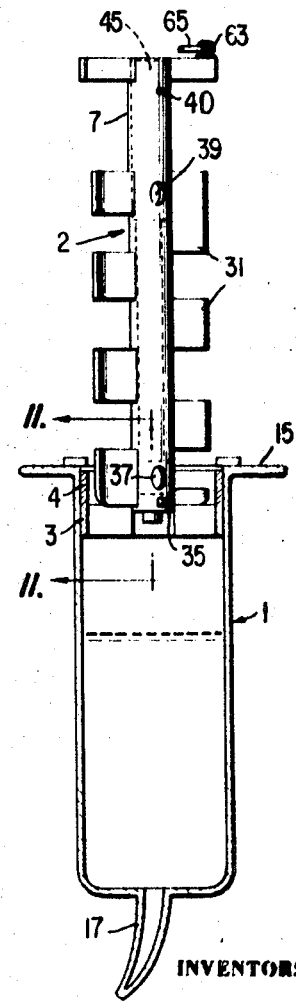

FIG. 1 is a perspective view illustrating the syringe of the present invention and its associated apparatus, FIG. 2 is a partial sectional view of the assembled syringe in a position ready for operation, FIG. 3 is a top view of a stopper means used for enclosing the syringe during mixing and for ejecting the fluid from the syringe subsequent to mixing, FIG. 4 is a top view of the mixing device, FIG. 5 is an elevational side view of the plunger-releasing means used for forcing the accelerator into intimate contact with the base, FIG. 6 is a top view of the plunger-releasing means, FIG. 7 is a partial sectional view taken substantially through a plane indicated by section line 7—7 of FIG. 8, FIG. 8 is a side sectional view of the syringe of the present invention showing the accelerator being forced into intimate contact with the base by means of the plunger releasing means, FIG. 9 is a partial sectional view showing the syringe of the present invention in a position for ejecting the mixed fluid from the housing, FIG. 10 is a top sectional view of the stopper means in proper alignment for engagedly contacting the mixing device so as to eject the mixed material from the syringe housing, FIG. 11 is a partial sectional view taken substantially through a plane indicated by section line 11—11 in FIG. 9.

DETAILED DESCRIPTION OF THE INVENTION

The syringe device of the present invention, as can be seen from FIG. 1, comprises a housing 1, a mixing device 2, a pair of stoppers 3 and 4 and a plunger-releasing means 5.

When properly assembled, as shown in FIG. 2, the mixing device 2 is enclosed in housing 1 and is held in place by stoppers 3 and 4. The plunger 5 is locked by locking means 41 into the central bore of elongated conduit 7 of mixing device 2. Referring to FIG. 1, it can be seen that the housing 1 has an open upper portion 11 and a sealed lower surface 13. Extension or handle grips 15 are provided near the upper open portion 11 and a tapered nipple 17 is provided on the lower surface for guiding ejected materials from the syringe. Stoppers 3 and 4 are provided, each having central apertures 19 and 21 passing through each stopper and major apertures 23 and 25 passing through the stopper along one diameter, such that only a thin rim of material is present at their extremities to connect the two halves of each stopper. Each stopper also has minor apertures 27 and 29 which are smaller in length than the major apertures and are situated along a different diameter of the stopper.

In the first stopper 3, as seen in FIG. 3, the minor aperture 27 passes through the entire width of the stopper, while in the second stopper 4, the minor aperture 29 passes only half way through the width of the stopper. This can better be seen by reference to FIG. 11, which is a side view of stoppers 3 and 4. The stoppers are shaped so that they fit snugly into the housing 1.

The mixing device 2, also shown in top view in FIG. 4, is provided having an elongated central conduit portion 7 and a plurality of paddle projections 31 emanating radially therefrom and staggered along the length of the conduit 7. There is no preferred order for arranging the paddle projections around the tube and depending upon the particular base materials used, the paddle can be placed either on opposite ends of the diameter of the tube or can be staggered at different angles along the tube. As shown in the figures, the paddles are arranged on diametrically opposite sides, but it is only necessary that all paddles on the same approximate plane be in substantial alignment and correspond in configuration to the configuration of the major apertures of the stoppers so that the paddles can be easily passed through each of the stoppers by proper manipulation of the stoppers and paddles. It is desirable, however, that the plane of the uppermost surface of the paddles, closest to the top of the mixing device be formed in parallel alignment to the plane of stopper 3 so that when the syringe is fully assembled, as shown in FIG. 2 stopper 3 will rest in smooth contact with the upper surface of the top paddles, thereby preventing the stoppers from accidentally becoming enlodged into the housing 1.

A gripping or handle projection 33 is situated at or near the top of the conduit and a locking projection 35 is situated near the bottom of the conduit. Openings 37 and 39 are provided in the mixing device conduit 7. Opening 39 is situated near the top, uppermost paddle and opening 37 is situated near the bottom lowermost paddle. The opening 37 near the bottom of the conduit is covered with a thin easily rupturable layer of film, such as a plastic having serrated cross-sections. The conduit is also provided with a pinhole 40, which is adequate for receiving a locking pin 41.

As can be seen by comparing FIGS. 3 and 4, the paddle projections 31, the diameter of conduit 7 and the apertures of the stopper are all precision dimensioned so that the mixing device can be tightly passed through stopper 3 and fitted into stopper 4. This precision fit of the conduit and central bore of the stopper is imported to prevent possible contamination of the materials held in the syringe by contact with moisture and impurities from the atmosphere. If necessary, the fit can be improved by lubricating the stoppers with cork grease or other lubricant.

A plunger type fluid releasing means 5 is provided having a piston tip 43 at its lower end and a sleeve section 45 on its upper end. This plunger can best be seen by reference to FIG. 5, which is a frontal view of the plunger and FIGS. 6 and 7 which are sectional top views of the plunger. As can be seen, the plunger comprises a central body 47 with rib-like protrusions 49 emanating from the central body. The sleeve section 45 is provided with a series of exhaust gas apertures 51 which pass through the sleeve 45 into the space defined by the rib projections 49, central portion 47 and the sleeve 45.

A pinhole 53 is provided along the central portion 47 or the plunger for receiving a locking pin 41 so that the plunger can be locked into conduit 7 of mixing means 2, as seen in FIG. 7.

As seen in FIG. 7, the plunger 5 with its rib section 49, sleeve section 45 and piston end 43 are dimensioned so that the piston fits snugly against the inside part of the central bore 7 of the mixing device 2, as seen in FIG. 2.

Referring again to FIG. 2, when assembling the elements of the present invention, the hollow cylindrical housing 1 is first partially filled to level 55 with a base rubber material and tube 7 of the mixing device 2 is partially filled to level 57 with a suitable accelerator. The mixing device 2 is then inserted into stoppers 3 and 4 and the stoppers and mixing device combination are inserted into housing 1. Lock slides 59 are fitted into place at the top portion of the rubber stoppers so that they are prevented from accidentally being dislodged from the housing. The stoppers are prevented from accidentally entering further into the housing by resting on top of the upper paddle projections. When properly assembled with the mixing device contained within the housing, the stoppers are rotated with respect to each other so that their major apertures are not in alignment thus preventing exposure of the materials contained within the housing from contamination by impurities and moisture in the atmosphere. When the mixing device is inserted into the housing, plastic layer covered opening 37 will be beneath the surface of the rubber base material and opening 39 will be above the surface of the base rubber material, i.e., between the liquid surface and the bottom of the stoppers. The bottom of the mixing device conduit is fitted into the inlet of the tapered nipple 17 so as to act as an axle for the rotation of the paddle projections 31. A precision fit between the inlet of the tapered nipple and the bottom of the mixing device is desirable to prevent leakage of fluid from the system and to prevent contamination by impurities carried in the atmosphere. The blockage of microscopic openings to this area can also be enhanced by a lubricant as described for the junction of the stoppers and mixing device.

The plunger 5 is fitted into the mixing conduit 7 so that the piston end 43 of the plunger 5 is adjacent to and seals paddle opening 39. Locking means 41 of the mixing device is brought into alignment with locking pin opening 40 of the mixing device and the plunger is locked into place by insertion of the pin into hole 53 of the plunger. The syringe is now in proper position for storage preparatory for use in mixing and ejecting a rubber base material for taking dental impressions.

When it is desired to take such an impression, the locking pin is released and the plunger is forced down into the tube of the mixing device as shown in FIG. 8. The force of the piston against the accelerator fluid causes the serrated plastic cover over tube opening 37 to break and the materials within the conduit of the mixing device 2 are forced into the chamber of the housing 61 defined by the walls of the housing and the mixing device 2. The level of the fluid in the chamber is raised to level 56 by the addition of the accelerator. As the plunger is driven downwardly, the piston tip 43 of the plunger moves away from tube opening 39. Any gases within the housing are thereby permitted to vent from the chamber of the housing and out through the gas vent aperture 51 provided in the plunger sleeve. This also releases any pressure created by the additional volume of liquid entering the housing chamber. As the plunger reaches the end of its downward movement, the sleeve 45 of the plunger is moved into juxtaposition with tube opening 39, thereby preventing fluid within the chamber from re-entering the tube of the mixing device. This effectively prevents moisture and impurities from entering the system from the atmosphere during the mixing phase.

The syringe is then placed onto a stand attached to a high torque mixing motor, not shown, having suitable supports. Torque is applied from the motor to the mixing device by means of a metal chuck which is machined to precisely fit the handle or gripping extensions 33.

If desired, instead of using a mixing motor, the paddles can be rotated by hand with a pop-up rotatable arm 63 which is attached to gripping extensions 33 by means of a hinge device 65.

After the two components of the rubber base are thoroughly mixed, the device is removed from the motor and stand and the paddle projections 31 on the mixing device 2 are rotated and pulled upward through the major aperture 25 and the central aperture 19 of the stopper 3 as shown in FIG. 9. Locking projection 35 on tube 7 of the mixing device is pulled upward through minor aperture 27 of stopper 3. Stopper 3 is then rotated until the apertures of stoppers 3 and 4 are in relative alignment one to another. This allows the paddle extensions to be further pulled upward through the major and minor apertures 23 and 29 and the central aperture 21 of stopper 4. Due to the locking projection, the mixing device can only be passed through a portion of stopper 4. The stopper locks 59 prevent the stoppers from accidentally being dislodged from the housing during this movement. In this position, the upper stopper can be rotated so that the major apertures of stoppers 3 and 4 are no longer in relative alignment, as shown in FIG. 10, thereby firmly fixing the mixing device between the two stoppers. This locking arrangement can further be seen by cross-sectional view of FIG. 11.

Mixing device 2, in combination with stoppers 3 and 4, can then be used as a piston for extruding the well mixed fluid, contained within the housing, through the tapered nipple 17.

By using inexpensive plastic for construction the syringe of the present invention, and by using inexpensive rubber stoppers, the syringe can be economically used once and then discarded.

The mechanized, proportional, disposable features for this invention can eliminate manual mixing of the base and accelerator materials, separate loading of individual dispensing syringes for each of the base and accelerator, post impression cleaning of instruments and work area. The result of using this device therefore is a significant saving in time, labor and miscellaneous equipment, such as spatulas, mixing pads, and separate dispensing syringes.

Moreover, the preproportioned materials can be admixed with a greater degree of uniformity which provides a more consistent working viscosity and setting time from one batch to the next. Also, since the syringe of the present invention provides a closed system, the ingredients can be admixed without introducing moisture, air bubbles or other impurities into the impression materials during the mixing procedure.

Having generally described the invention, what is claimed and intended to be covered by Letters Patent is.

We claim:

1. A mixing and dispensing syringe comprising a tubular housing of uniform cross-section, said housing being open at the top and closed at the bottom except for a restricted discharge opening and adapted to contain a body of liquid, a stirring device extending axially downward into said housing to a point adjacent the bottom thereof and comprising a central tubular portion having an external diameter substantially less than the inner diameter of said housing, stirring blades extending radially from the outer surface of said tubular portion, and a locking projection extending radially outward from said tubular portion at a point circumferentially spaced from said blades and adjacent the lower end of said portion, upper and lower stoppers snugly but slidably fitting into the upper portion of said housing, each of said stoppers having an axial central opening fitting closely about said tubular portion and additional openings extending radially outward from said central openings and being of such size and configuration as to permit passage of the stirring blades as the stirring device is withdrawn from the housing, and each stopper also having an opening of a size and configuration to receive said locking projection, said last mentioned opening in the lower stopper extending entirely through said stopper but the corresponding opening in said upper stopper extending from the bottom of the stopper only part way to the top thereof, whereby when said stirring device is withdrawn from said housing, its passage will be arrested by engagement of the locking projection with the upper stopper, the depth of the recess in the upper stopper which receives said projection being such that the projection will be contained entirely in that stopper, thus permitting rotation of the lower stopper to move the radial openings of the two stoppers out of registry with each other so that the stoppers cooperate to form a closed piston which may be forced downwardly into the housing to expel liquid therefrom through the discharge opening.

2. A syringe as defined in claim 1 wherein the two stoppers are in contact with each other and wherein the bottom of the lower stopper is in contact with the upper blades of the stirring device and the top of the upper stopper is engaged by a stopper lock projecting from the housing over the said stopper to prevent removal thereof.

3. A syringe as in claim 2 wherein said tubular portion is seated at its lower end in the mouth of the discharge opening of the housing and is adapted to be rotated about its axis to stir a liquid in said housing.

4. A syringe as in claim 1 wherein the lower section of said tubular portion is closed except for an opening having a rupturable cover and is adapted to contain a liquid to be mixed with a liquid contained in said housing, and wherein a plunger is fitted snugly in said tubular portion and is adapted when depressed to cause the liquid contained therein to rupture said cover and flow into the housing.

5. A mixing and dispensing syringe comprising a tubular housing of uniform cross-section, said housing being open at the top and closed at the bottom except for a restricted discharge opening and being adapted to contain a body of liquid, a stirring device extending axially downward into said housing to a point adjacent the bottom thereof and comprising a central tubular portion having an external diameter substantially less than the internal diameter of said housing, and stirring blades extending radially from the outer surface of said tubular portion within the housing, said tubular portion being closed at its lower end and having a lateral opening closed by a rupturable cover adjacent said end and also having a lateral opening at a point near the upper end of the housing, stopper means snugly fitting into said housing at the upper end of the housing above said last mentioned opening and having an axial opening snugly fitting about the tubular portion of the stirring device, a plunger axially slidable within said tubular portion and comprising a piston at its lower end and a sleeve at its upper end, both said piston and said sleeve being adapted to fit sealingly against the inner wall of said tubular portion, the section of said plunger intermediate the sleeve and piston being so shaped and proportioned as to permit the passage of gas or vapor within the tube above the piston and up through the sleeve, and the upper portion of the sleeve being vented, said piston and said sleeve being axially spaced by an amount corresponding to the spacing of said upper and lower openings in said tubular portion of the stirring device, whereby said piston may assume an upper position in which it will seal the upper opening in the tubular member and seal off a body of liquid contained between the piston and the bottom of said member and whereby downward movement of the piston will rupture the said rupturable cover and force liquid below it into the housing and whereby, further vapor or gas may escape through the upper opening in said tubular portion, which has been uncovered by the downward movement of the piston and whereby finally the said sleeve will seal said upper opening when the piston reaches the bottom of said tubular portion.

6. A mixing and dispensing syringe as in claim 5, prepared for storage and immediate use, wherein said housing contains a body of a first liquid sealed therein by said stopper means, a body of a second liquid is contained in the lower part of the tubular portion of said stirring device, and the piston of said plunger is positioned to close the upper lateral opening in said tubular portion, thus sealing the second liquid in said portion.

7. A mixing and dispensing syringe as in claim 6 wherein locking means are provided for releasably holding said plunger and tubular portion in the position in which the piston closes said upper lateral opening.

References Cited

UNITED STATES PATENTS

| 3,144,966 | 8/1964 | Cook | 222—145X |
| 3,437,242 | 4/1969 | Poitras | 222—145X |
| 3,518,018 | 6/1970 | Woods | 222—145X |

ROBERT B. REEVES, Primary Examiner

N. L. STACK, Jr., Assistant Examiner

U.S. Cl. X.R.

222—229